D. KEMBLE.
ELECTRIC GENERATOR AND MOTOR.
APPLICATION FILED JAN. 13, 1910.
974,497.
Patented Nov. 1, 1910.
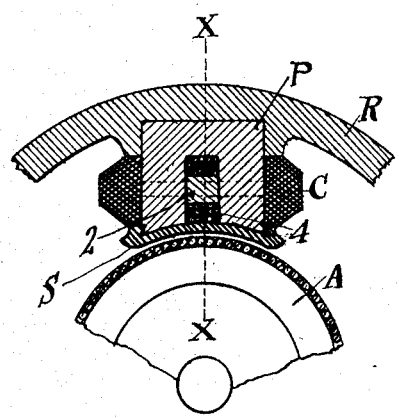
Fig. 1.
Fig. 2.
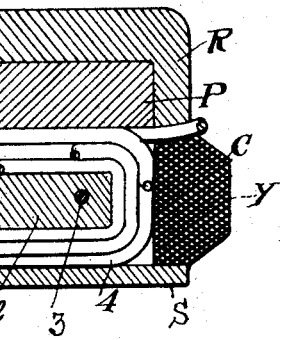
Fig. 3.
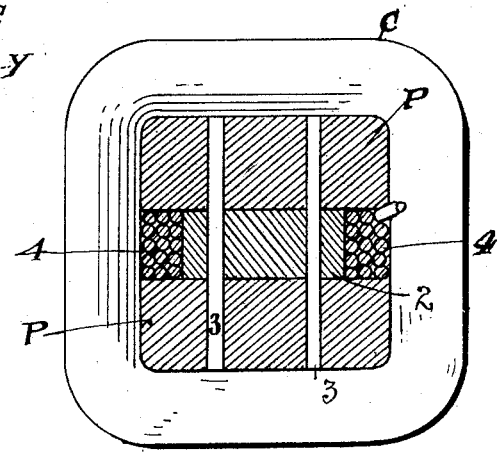
Fig. 4.
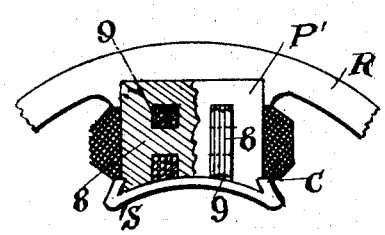
ATTEST
E. M. Fisher
J. C. Musson
INVENTOR
DUSTON KEMBLE
By Fisher & Moore, ATTYS.
THE NORRIS PETERS CO., WASHINGTON, D. C.

UNITED STATES PATENT OFFICE.

DUSTON KEMBLE, OF LAKEWOOD, OHIO.

ELECTRIC GENERATOR AND MOTOR.

974,497.     Specification of Letters Patent.     Patented Nov. 1, 1910.

Application filed January 13, 1910. Serial No. 537,975.

*To all whom it may concern:*

Be it known that I, DUSTON KEMBLE, citizen of the United States, residing at Lakewood, in the county of Cleveland and State of Ohio, have invented certain new and useful Improvements in Electric Generators and Motors, of which the following is a specification.

My invention has reference to an improvement in electric generators and motors provided with compensating windings, whereby armature reaction and sparking at the commutator are materially reduced if not wholly overcome, all substantially as shown and described.

In the accompanying drawings, Figure 1 is a side elevation of a single magnetic generator or motor pole embodying my invention in one of its forms and showing a section of a magnet ring about the same and a portion of an armature presumably in working relations. Fig. 2 is a sectional elevation of said parts on line $x$—$x$, Fig. 1, and somewhat enlarged, and Fig. 3 is a sectional elevation on line $y$—$y$, Fig. 2. Fig. 4 is a view of a modification of the invention having a plurality of compensating core members.

The invention as thus shown is developed along lines suggesting simplicity of construction which not only requires the minimum amount of wire to secure the desired effects but also presents no obstruction in the way of removal and replacement of the main magnetizing coils wherever this may be necessary. To these ends the first example of the invention, disclosed in Figs. 1 to 3 inclusive, comprises a pole member or field member P, which may be either solid or laminated, and which is provided with a central radial slot or recess approximately two-thirds the entire depth of said piece, in this instance, and having a centrally disposed core or cross piece 2 inserted therein and secured permanently or detachably by wires 3 or other suitable means. That is, said core piece 2 is centrally located in said radial slot or recess and of such reduced size as compared with said slot that space is provided about the same within the slot or recess for the special winding of the compensating coil 4 therein and not more than will comfortably fill said slot, the said winding being in a substantially radial plane to the axis of rotation of armature A and at substantially right angles to main coil C. This compensating coil is preferably wound in series with the armature of the generator and the length of core 2 is such that the requisite windings 4 about the same comes inside of or flush even at the outside with the side faces of the pole piece P and thus permits the usual magnetizing coil C to be slipped over the same and in compact relations therewith. Furthermore, the end connections should be so arranged that the effect of the current in said compensating coil will be to increase the magnetizing flux of the pole on the side where the counter-magnetizing force in the armature tends to neutralize it, and vice versa on the other side in proportion to the strength of the current in the main circuit as is usual in other machines. The said pole piece P is supplemented by a shoe S on its inner side next to armature A, and the cross piece or core 2 which carries the compensating coil should be as near to said shoe as convenient, and on the other hand as far as convenient from the magnet ring R so that its effect or force will be expended mostly upon said shoe.

Fig. 4 shows a modification of the invention chiefly in the duplication or multiplication of the slots and magnet cores or cross pieces, the same comprising a pole member or magnet P' with two slots and a cross piece or core 8 in each slot and each wound with a compensating coil 9 as in Figs. 1, 2 and 3. In this instance, however, the said cores or cross pieces are integral with the pole member P', and the wires of the coil 9 are threaded through the slot, particularly in those types and sizes of machines wherein small wires are commonly used, and the construction shown may be still further extended to increase the compensating area or action if found advantageous.

The essential difference herein over all the prior art with which I am familiar lies more especially in the construction of the magnet pole with one or more substantially radial slots therein and with cores or cross portions transversely of said slots adapted to make compensating windings therein, and this construction operatively associated with the main coil and the shoe S as hereinbefore described and particularly pointed out in the claims.

Rods or pins 3 may be dispensed with if desired, as removable core 2 and coil 4 may be held in place by shoe S and coil C without other means of fastening.

What I claim is :

1. In electric machines, a pole member having a slot radially therein and parallel to the axis of the armature shaft, a core piece transversely of said slot and a compensating winding about said core, and a coil about said pole member inclosing said compensating coil.

2. An electric machine having a field member provided with a radial recess extending across the same substantially at right angles to the plane of rotation of the armature, and a cross piece in said recess substantially parallel to the said plane of rotation and a compensating coil about the said cross piece within said recess and within the sides of said field member.

3. In electric machines, a pole member having a slot open thereinto from its inside and having a core transversely therein, a compensating winding about said core, a main coil about said member covering said winding and a shoe upon the inner side of said member across the mouth of said slot.

4. In an electric machine, field magnets formed with longitudinal openings therethrough, and an inner coil and an outer coil wound within and about said magnets respectively, and said inner coil being disposed in a plane substantially at right angles to the outer coil.

5. In electric machines, a pole member having a radial slot and a core piece removably mounted therein, a compensating winding about said core piece within said slot, and a main magnetizing coil about said pole member and said inner compensating winding.

6. In electric machines, a pole member having a slot radially therein and parallel to the axis of the armature shaft, a core piece removably mounted transversely of said slot and a compensating winding about said core and removable therewith, fastening devices to fix said core within said pole member, and a coil about said pole member inclosing said compensating coil.

In testimony whereof I affix my signature in presence of two witnesses.

DUSTON KEMBLE.

Witnesses:
E. M. FISHER,
F. C. MUSSUN.